United States Patent [19]
Price et al.

[11] 3,798,754
[45] Mar. 26, 1974

[54] SEMICONDUCTOR STRAIN GAGE AND METHOD OF FABRICATING SAME

[75] Inventors: James B. Price, Phoenix; Israel A. Lesk, Scottsdale, both of Ariz.

[73] Assignee: Motorola, Inc., Franklin Park, Ill.

[22] Filed: May 15, 1972

[21] Appl. No.: 253,081

[52] U.S. Cl.................. 29/583, 29/580, 29/610, 29/23.35
[51] Int. Cl............................................... B01j 17/00
[58] Field of Search ............. 29/580, 583, 578, 576, 29/610 SG, 594, 595, 25.35; 73/88.5 SD

[56] References Cited
UNITED STATES PATENTS

| | | | |
|---|---|---|---|
| 3,331,124 | 7/1967 | Hall | 29/577 |
| 3,351,880 | 11/1967 | Wilner | 73/88.5 SD |
| 3,369,290 | 2/1968 | Mayer et al. | 29/583 |
| 3,492,513 | 1/1970 | Hollander et al. | 73/88.5 SD |

Primary Examiner—W. C. Tupman
Attorney, Agent, or Firm—Vincent J. Rauner; Henry Olsen

[57] ABSTRACT

A piezoresistive semiconductor strain gage for transforming mechanical stress into a changed resistance of the semiconductor and therefore a changed electrical current therethrough representative of the amount of stress is described. Also described is a method of fabricating the strain gage that is reliable and results in each produced strain gage having the characteristics of all of the others. The strain gage is comprised of a piezoresistive silicon body having enlarged ends. A KOH etch is made in each end and an epitaxial layer is therein. THEREIN. The epitaxial layer is of the same conductivity type as the piezoresistive silicon but is much more heavily doped to provide low resistance paths to solderable contacts connected to the epitaxially grown material. The combination of enlarged ends and reduced center provides stress amplification, resulting in a greater sensitivity of the strain gage.

8 Claims, 13 Drawing Figures

SEMICONDUCTOR STRAIN GAGE AND METHOD OF FABRICATING SAME

BACKGROUND OF THE INVENTION

1. Field of the Invention

This invention pertains to transducers used to transform mechanical motion or stress into changes in electrical current representative of the amplitude of the mechanical motion or stress. More specifically, this invention relates to piezoresistive semiconductive material which changes resistance in response to a mechanical deformation.

2. Description of the Prior Art

The physics of piezoresistive semiconductive material is well documented in the prior art. For example, monocrystalline silicon has been extensively tested. A meaningful measure of the ability of the selected material to change resistance in response to a mechanical force is known as the "gage factor." The gage factor is defined as the fractional change in resistance per unit strain. It is mathematically defined as follows:

$$GF = dR/R_0 dL/L_0$$

wherein:
  $R_0$ is the initial resistance
  $L_0$ is the initial length
  $dR$ is the change in electrical resistance
  $dL$ is the change in length Wire strain gages were very common prior to the discovery of properties of piezoresistive semiconductive material. The wire strain gages showed negligible conductivity modulation because of applied forces. Nevertheless, they have been the cornerstone of the strain gage technology over the years. The sensitivity exhibited by wire strain gages is much smaller than that of piezo-resistive silicon, for example. Piezoresistive silicon may be many order of magnitude more sensitive than wire strain gages. The following table sets out the gage factor for the various types of semiconductive material and the crystallographic orientation of that material.

TABLE 1

| Material | Carrier Type | Orientation | GF |
|---|---|---|---|
| Si | P | 111 | 175 |
| Si | N | 111 | −5 |
| Si | N | 100 | −133 |
| Si | P | 100 | 5 |
| Ge | N | 111 | −157 |
| Ge | P | 111 | 102 |
| InSb | P | 100 | −45 |
| InSb | N | 100 | −74 |

The maximum gage factor occurs in the [111] direction of P type silicon of resistivity greater than 1.0 ohm centimeter. It has further been determined that maximization of GF also maximizes the temperature coefficient of GF and does not minimize the non-linearity in applied stress. These effects on GF require various tradeoffs.

Uniform fabrication of piezoresistive semiconductor devices has been difficult to achieve. The applicants' unique method of fabrication solves this problem, yielding gages whose characteristics are very uniform from one to another.

BRIEF SUMMARY OF THE INVENTION

A piezoresistive monocrystalline silicon wafer cut along the [100] crystallographic plane and being of an N conductivity type is the material selected in the preferred embodiment of this invention. It is selected over P conductivity type silicon cut along the [111] crystallographic plane even though the latter material exhibits a higher GF. This selection is made because in the unique method of fabrication it has been determined that potassium hydroxide (KOH) is very good for the etching steps. Silicon cut along the [111] plane does not lend itself nicely to etching by KOH. On the other hand, silicon cut along the [100] plane is readily etched by KOH and the etch is easily controlled.

A substrate of monocrystalline, piezoresistive silicon provides the basic material for fabrication of the strain gage. As mentioned above, it is of N conductivity type and is cut along the [100] crystallographic plane. A selection can of course be made from any of the materials set out in the table above. Briefly, a pair of holes is etched using a KOH etchant and the holes are back-filled by epitaxially growing silicon of the N conductivity type therein. The epitaxial growth is heavily doped to provide a low resistance path.

The manufacturing technique anticipates the fabrication of many of the strain gages on one substrate. To enable the alignment of a mask to form very many of the gages on a single substrate, a sirtl etch is performed which outlines the junction between the piezoresistive substrate and the epitaxially grown regions. The visible junctions permit accurate alignment of the mask.

Another etching step is performed between the back-filled holes, this second etch being less in depth than the first described etch. A beam is formed which is considerably smaller in cross-sectional area than its ends which hold the epitaxially grown material.

A third etch, deeper than the first, is made to outline the form of the finished gage.

The electrical contacts are installed and the substrate is lapped from the bottom side to a point where the gages are of a desired total thickness.

In the preferred embodiment, the gages are designed for use within an animal bloodstream, therefore an isothermal environment exists. Consideration for temperature changes becomes minimal. Blood pressure exerts a force on the gage, thus changing the current flow through it.

It is therefore an object of this invention to provide a device for insertion into a living animal bloodstream for blood pressure measurement.

It is another object of this invention to provide a piezo-resistive semiconductor strain gage that is very reliable, whose characteristics when reproduced remain constant.

It is still another object of this invention to provide a method of fabricating piezoresistive semiconductor strain gages that is highly accurate and economical.

These and other objects will be made more clear in the detailed description that follows.

DETAILED DESCRIPTION OF THE INVENTION

Figure 1:
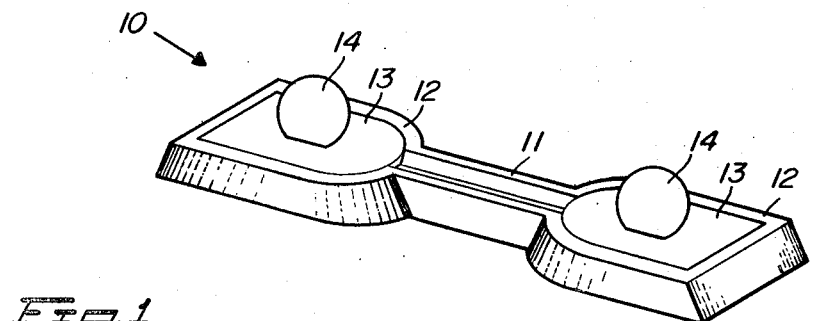
FIG. 1 is a perspective view of a finished strain gage.

FIG. 1 illustrates a strain gage 10 having a beam 11 with enlarged ends 12. Within the enlarged ends 12 are shown terminal regions 13 to which are attached electrical contacts 14.

Figure 2:
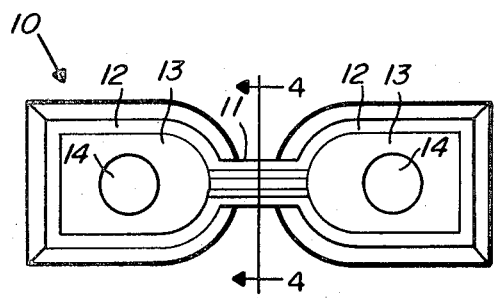
FIG. 2 is a top view of the finished strain gage.

FIG. 2 is a top view of the finished gage 10 showing a typical overall dimension of the beam 11 and its ends 12 as 75 mils. The dimension of the cross-section is shown as 25 mils.

Figure 3:
FIG. 3 is a side elevation of the finished strain gage.

FIG. 3 is a side elevation of the gage 10 showing a length of the beam 11 as 10 mils and a total thickness of the device, exclusive of the contacts 14, as 3 mils.

Figure 4:
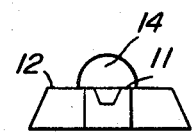
FIG. 4 is a section view taken along the line 4—4 of FIG. 2.

FIG. 4, taken through the center of the gage 10 on line 4—4 shows the width of the beam 11 as 5 mils.

A typical application for this gage is for measuring blood pressure within a blood vessel of a living animal. The dimensions noted above make it clear that the gage is ideally suited for such an application.

Figure 5A:
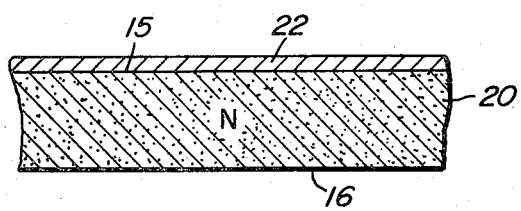
FIGS. 5a – 5i are cross-sectional views of the strain gage through the steps of the fabrication.

The need for low cost mass production, yielding consistent results is obvious. Referring now to FIG. 5a, the process steps will be described.

The preferred embodiment utilizes a piezoresistive N conductivity type silicon, substrate 20. Substrate 20 is appropriately dimensioned by lapping and polishing. A silicon nitride ($Si_3N_4$) layer 22 is deposited on bottom surface 15 which is presently the top surface of substrate 20. Substrate 20 is doped with an appropriate impurity at a desired concentration to cause it to have a gage factor of approximately −133 as indicated in Table 1. The use of $Si_3N_4$ as a protective layer enables the etching steps, to be described, to be carried on freely without regard to the protected surface 15 because of the resistance to the etchant by the layer 22.

Figure 5B:
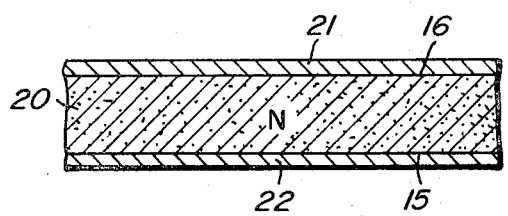

FIG. 5b illustrates substrate 20 having been turned upside down from FIG. 5a. A silicon dioxide ($SiO_2$) layer 21 is shown having been thermally grown over top surface 16 of substrate 20. The formation of layer 21 can be made through any number of well known techniques and is not limited to a thermal growth.

Figure 5C:
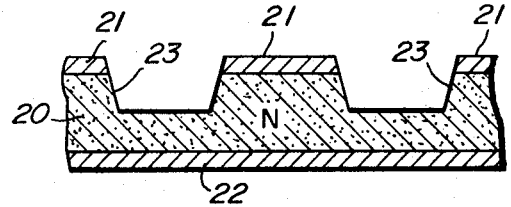

FIG. 5c illustrates substrate 20 after having had apertures 23 etched into it. The silicon etching step in this preferred embodiment is performed with potassium hydroxide (KOH). A photo-resist material is placed on layer 21 and hardened by selective light exposure, a well known technique. An $SiO_2$ etchant etches through the $SiO_2$ protective layer. The remaining photoresist material is removed and the wafers are cleaned for KOH silicon etching. In the preferred embodiment, the depth of silicon etch prior to growth is approximately 80 microns.

Figure 5D:
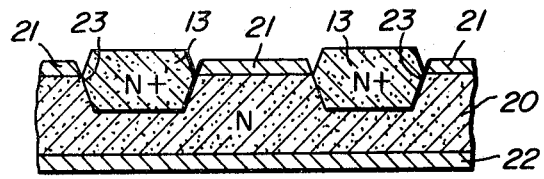

FIG. 5d shows terminal regions 13 having been epitaxially grown in apertures 23. As part of the epitaxial growth, a dopant is introduced in heavy concentration so that the terminal region 13 is of N+ conductivity type, with very low resistivity.

Figure 5E:
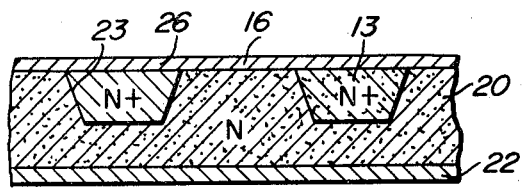

FIG. 5e illustrates another point in the fabrication of the gage 10. The terminal regions 13 have been lapped and polished along with the top surface 16 of substrate 20. A sirtl etch has also been made which enables the positioning of a mask over substrate 20 for subsequent operations by reason of the etch producing a visible mark at the junction between terminal regions 13 and substrate 20. $SiO_2$ layer 26 is then thermally formed.

Figure 5F:
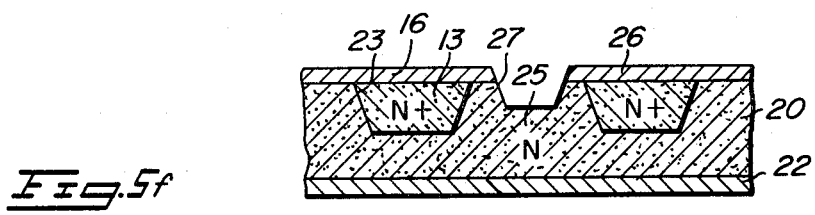

FIG. 5f illustrates a selective KOH etch to form channel 27 performed in the same manner as the KOH etch described above with reference to FIG. 5c. In this preferred embodiment, the depth of the etched channel 27 prior to growth is approximately 45 microns.

Figure 5G:
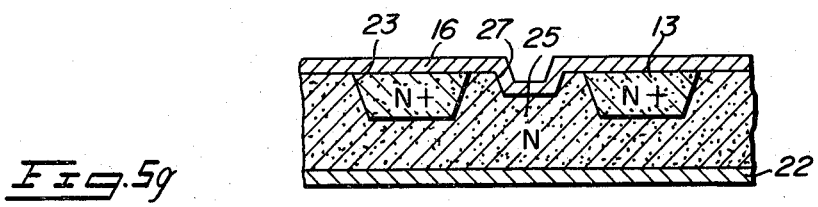

FIG. 5g illustrates the process after the remaining $SiO_2$ layer 26 has been stripped away. $SiO_2$ layer 28 is shown having been formed over surface 16 and within the etched channel 27.

Figure 5H:
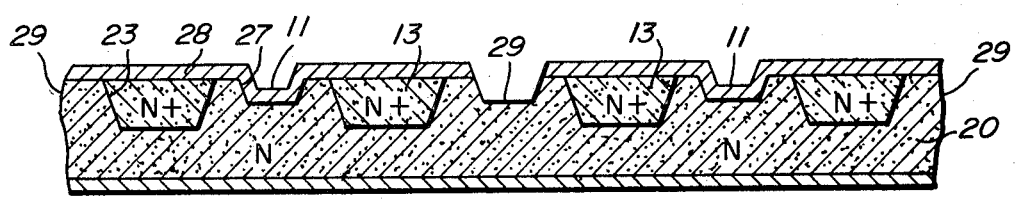

A third KOH etch is performed to form the gage as shown in FIG. 5h. Material adjacent the beam 11 and its enlarged ends 12 is etched away to a prescribed depth of approximately 70 microns in this preferred embodiment shown in FIG. 5h as channel 29.

Figure 5I:
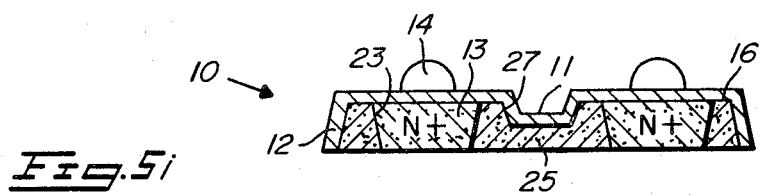

FIG. 5i illustrates a finished gage 10 after having had electrical contacts 14 formed on terminal regions 13. The formation of electrical contacts 14 is a well known art. It is accomplished by selectively removing $SiO_2$ layer 28 and then evaporating aluminum. The aluminum is removed, except for the desired electrical contact area. Then chromium, copper and gold are evaporated through a mask onto the aluminum. Finally, a mixture of tin and lead is deposited, forming a solderable electrical connector.

After the contacts 14 have been installed, the substrate 20, containing many substantially finished gages 10 has adhesive wax applied to its top surface and is then attached by the wax to a lapping plate. A well known lapping and polishing technique is used to remove material, including layer 22 to the third etch dimension, releasing the gages. Then, the gages are removed from the lapping plate.

The preferred embodiment as herein described is now ready for placement within a catheter. The catheter protects the gage from blood and body fluids but must be able to transmit the blood pressure force to the gage. A changing current through the gage is representative of the blood pressure being measured.

Those skilled in the art are aware that this invention has many uses other than for measuring blood pressure. All within the intent and scope of this invention, gas pressure and mechanical vibration might be measured with this sensor. The gage, of course, is not limited to the approximate dimensions herein noted.

We claim:

1. A method of manufacturing a semiconductor strain gage, starting with a monocrystalline semiconductor substrate cut along a prescribed crystallographic plane and having a prescribed impurity content to yield a desired gage factor, comprising the steps of:

a. etching at least one pair of holes to a first depth from the top surface of the substrate;
   b. growing epitaxial monocrystalline semiconductive material in the pair of holes, the epitaxial material having a prescribed impurity content to provide high conductivity, forming the conductive terminal regions of the gage;
   c. etching to a second depth from the top surface, less than the first depth, between the pair of conductive ends to form a member therebetween having a reduced cross-sectional area;
   d. etching to a third depth from the top surface, greater than the first depth, around the conductive ends and the flexing member to form the outline of the gage;
   e. forming an electrical contact on each of the conductive ends; and f. removing material from the bottom side of the substrate until a desired thickness of gage remains.

2. The method of claim 1 wherein the monocrystalline substrate is comprised of N conductivity type silicon cut along the 100 crystallographic plane and the epitaxial growth is comprised of N conductivity type silicon more heavily doped then the substrate.

3. The method of claim 1 wherein the monocrystalline substrate is comprised of N conductivity type silicon cut along the 110 crystallographic plane and the epitaxial growth is comprised of N conductivity type silicon, more heavily doped than the substrate.

4. The method of claim 2 wherein each of the etching steps is accomplished through the use of KOH as an etchant.

5. The method of claim 4 further comprising, before the step of etching to a first depth, the step of depositing silicon nitride on the bottom surface of the substrate.

6. The method of claim 5 further comprising, after the step of growing epitaxial monocrystalline semiconductive material, the steps of:
  g. polishing the top surface of the substrate to smooth the epitaxial growth; and
  h. sirtl etching the top surface of the substrate to make the epitaxial growth visible.

7. The method of claim 6 wherein the step of forming the electrical contacts further comprises:
  e. i. evaporating aluminum over the gage;
  ii. removing the evaporated aluminum except for the desired terminal areas;
  iii. evaporating successively, through a mask, over the remaining aluminum, chromium, copper, and gold; and
  iv. depositing a mixture of lead and tin over the evaporated metals to form solderable terminals.

8. The method of claim 7 wherein the step of removing material from the bottom side of the substrate further comprises:
  g. i. applying an adhesive wax to the top surface of a plate;
  ii. contacting the waxed top surface of the plate with the substrate causing adhesion between the plate and the substrate; and
  iii. lapping and polishing from the bottom surface of the substrate until a desired thickness of gage is reached.

* * * * *